US008345867B2

(12) United States Patent
Yoon et al.

(10) Patent No.: US 8,345,867 B2
(45) Date of Patent: Jan. 1, 2013

(54) METHOD AND APPARATUS FOR GENERATING PSEUDO RANDOM SEQUENCE IN BROADBAND WIRELESS COMMUNICATION SYSTEM

(75) Inventors: Sung Jun Yoon, Seoul (KR); Sung Jin Suh, Seoul (KR); Myung Cheul Jung, Seoul (KR)

(73) Assignees: Pantech Co., Ltd., Seoul (KR); Pantech & Curitel Communications, Inc., Seoul (KR)

( * ) Notice: Subject to any disclaimer, the term of this patent is extended or adjusted under 35 U.S.C. 154(b) by 419 days.

(21) Appl. No.: 12/629,570

(22) Filed: Dec. 2, 2009

(65) Prior Publication Data

US 2010/0135493 A1 Jun. 3, 2010

(30) Foreign Application Priority Data

Dec. 2, 2008 (KR) .................. 10-2008-0121495

(51) Int. Cl.
*H04J 13/10* (2011.01)
(52) U.S. Cl. .................................. 380/44; 375/140
(58) Field of Classification Search .............. 380/44, 380/47, 268; 370/47; 375/140, 146
See application file for complete search history.

(56) References Cited

U.S. PATENT DOCUMENTS
5,974,144 A * 10/1999 Brandman .................. 380/216

OTHER PUBLICATIONS

Esmael H Dinan, Bijan Jabbari "Spreading Codes for Direct Sequence CDMA Cellular Networks".*
3GPP Organization Partners, 3rd Generation Partnership Project; Technical Specification Group Radio Access Network; Evolved Universal Terrestrial Radio Access (E-UTRA); Physical Channels and Modulation (Release 8), 3GPP TS 36.211, Nov. 2007, pp. 1-54, vol. 8.1.0, 3GPP, France.
3GPP Organization Partners, 3rd Generation Partnership Project; Technical Specification Group Radio Access Network; Evolved Universal Terrestrial Radio Access (E-UTRA); Physical Channels and Modulation (Release 8), 3GPP TS 36.211, May 2008, pp. 1-77, vol. 8.3.0, 3GPP, France.

* cited by examiner

*Primary Examiner* — Gilberto Barron, Jr.
*Assistant Examiner* — Devin Almeida
(74) *Attorney, Agent, or Firm* — H.C. Park Associates, PLC (57) ABSTRACT

Provided are a method and an apparatus for generating pseudo random sequence to generate pseudo random sequences which have larger sizes and are different from each other in a wireless communication system; a method for generating pseudo random sequence in a wireless communication system, comprising generating a first output sequence, generating a second output sequence, and generating a third output sequence; and an apparatus to generate pseudo random sequence in a wireless communication system, comprising a first linear feedback shift register (LFSR), a second LSFR, and a third LFSR, a first initial value mapper, a second initial value mapper, a third initial value mapper, and an N delay operator.

22 Claims, 5 Drawing Sheets

METHOD AND APPARATUS FOR GENERATING PSEUDO RANDOM SEQUENCE IN BROADBAND WIRELESS COMMUNICATION SYSTEM

CROSS-REFERENCE TO RELATED APPLICATION

This application claims priority from and the benefit of Korean Patent Application No. 10-2008-0121495, filed on Dec. 2, 2008, which is hereby incorporated by reference for all purposes as if fully set forth herein.

BACKGROUND OF THE INVENTION

1. Field of the Invention

This disclosure relates to a wireless communication system, and more particularly, to a method of generating pseudo random sequence in a broadband wireless communication system and an apparatus for generating pseudo random sequence using the method.

2. Discussion of the Background

Scrambling code is used for identifying mobile station (user equipment or UE)-specific and cell (base station)-specific identification information in a wireless communication system. Generally, scrambling code identifies a base station in a downlink and identifies a mobile station in an uplink. This type of scrambling code randomizes or decreases the interference in a mobile station or a mobile station by other mobile station or cell, and may be used as one of the methods for increasing the cell capacity.

In the case of a 3GPP Long Term Evolution (LTE) system, the scrambling code is commonly applied to each physical channel and each physical signal of an uplink and a downlink. For example, in the process of an uplink physical channel in the 3GPP LTE system, each bit which passed through channel coding is scrambled with signs generated by a scrambling generator bit by bit through a modulo 2 operation. The scrambled bits are input to a modulation mapper to be mapped to complex-valued symbols by modulation methods such as Quadrature Phase Shift Keying (QPSK), 16 Quadrature Amplitude Modulation (16QAM), and 64 Quadrature Amplitude Modulation (64QAM). In the process of a downlink physical channel in the 3GPP LTE system, similarly to the uplink, bits which passed through channel coding and were inputted as code words are scrambled and inputted to the modulation mapper.

In general, the aforementioned scrambling code is generated on the basis of a pseudo-random sequence having good correlation characteristics. A well-known pseudo-random sequence may include an m-sequence, a Gordon-Mills-Welch (GMW) sequence, a Legendre sequence, or the like. The m-sequence may be converted into a primitive polynomial of degree m over GF(2), and implemented by using a Linear Feedback Shift Register (LFSR).

The pseudo-random sequence such as the m-sequence has optimal periodic autocorrelations. However, since the size of only a single m-sequence is 1, there is a limit to using the pseudo-random sequence as scrambling code requiring different random sequences having good cross-correlations (the maximum cross-correlation value is low and the number of kinds of cross-correlations is small). Therefore, in general, by mathematically connecting pseudo-random sequences, different pseudo-random sequences of size M are generated to be used as scrambling code. Particularly, one of the most widely used methods in a wireless communication system is a method of mathematically connecting two m-sequences and generating scrambling code using a Gold sequence generated as a result.

Recently, with the development of a wireless communication system, in order to identify more pieces of mobile station-specific and cell-specific system information, different scrambling code groups having a larger size are needed. In a 3GPP Wideband CDMA (3GPP WCDMA) system developed on the basis of the Global System for Mobile communication (GSM), which is one of the most prominent standards among standards of the third-generation International Mobile Telecommunications-2000 (IMT-2000), scrambling code for identifying specific system information of 25 bits by using a Gold sequence in the case of m=25, is used.

In a 3.9G (Pre-4G) LTE system developed from the 3GPP WCDMA, in order to identify more sufficient pieces of information than the early standardization process, a method of generating scrambling code having a very large size was proposed. However, in the method of identifying mobile station-specific and cell-specific system information of 40 to 50 bits or more by using the Gold sequence in the case of m=40 or m=50 or more as the proposed scrambling code, there is a problem in that hardware complexity increases due to blocks (block or box) in a number of LFSRs connected in series.

In consideration of this, in the early standard TS36.211-8.1.0 of a physical layer part of the 3GPP LTE, in order to decrease the hardware complexity, it was agreed that mobile station-specific and cell-specific system information necessary for calculation was limited to 33 bits, and identified by scrambling code generated through the Gold sequence in the case of m=33. However, in the case of m=33, in consideration of hardware (HW) based on the 32-bit architecture, there still is a problem in terms of hardware complexity. Accordingly, a Gold sequence of m=32 or less has been considered. In the case of m=32, since m is a multiple of 4, the Gold sequence does not exist. Therefore, it has been finally determined that mobile station-specific and cell-specific system information is identified by scrambling code generated from a Gold sequence in the case of m=31 (TS36.211-8.3.0).

Large sets of scrambling codes are needed to identify more pieces of information. However, in consideration of hardware complexity of a current system, the standard is determined such that a minimum number of pieces of information are identified. For this, a method of generating scrambling code using a Gold sequence in the case of m=31 has been adopted. However, in a next-generation broadband wireless communication system which can require a number of different scrambling codes as a frequency band is broadened and a cell radius of, such as, a pico cell and a femto cell is reduced, the number of bits which is limited to identify mobile station-specific and cell-specific system information in a related art has to be increased. For this, instead of considering a 32-bit structure of hardware in the related art, a Gold sequence in the case where m is increased is considered while accepting hardware complexity.

Considering three factors which have an affect on the performance of scrambling codes, that is, size, maximum cross-correlation value, and period, since the Gold sequence in the case of m=31 is sufficient as a period (length) of scrambling code in an existing wireless communication system, a technique for maximizing size while reducing or maintaining the maximum cross-relation value is proposed.

SUMMARY OF THE INVENTION

Exemplary embodiments of the present invention provides a method of generating pseudo random sequence to generate different scrambling codes used for identifying mobile station-specific and cell-specific system information in a broadband wireless communication system, and an apparatus for generating pseudo random sequence using the same.

Exemplary embodiments of the present invention also provides a method of pseudo random sequence in a broadband wireless communication system to maximize a size while reducing or maintaining a maximum cross-correlation value, and an apparatus for generating pseudo random sequence using the same.

Exemplary embodiments of the present invention also provides a method of generating pseudo random sequence in a broadband wireless communication system to maximize a size while maintaining hardware complexity and an operation speed by employing three or more linear feedback shift registers (LFSRs), which are individually operated and connected in parallel, in consideration of a 32-bit structure of hardware, and an apparatus for generating pseudo random sequence using the same.

Additional features of the invention will be set forth in the description which follows, and in part will be apparent from the description, or may be learned by practice of the invention.

An exemplary embodiment of the present invention discloses a method for generating pseudo random sequence in a wireless communication system, comprising generating a first output sequence by inputting a fixed initial value to a first linear feedback shift register (LFSR) having m blocks at every initialization period; generating a second output sequence by inputting one of m-bit initial values to a second LFSR having m blocks at every initialization period; after inputting a predetermined initial value to a third LFSR having m blocks, generating a third output sequence by delaying a sequence output from the third LFSR by a given delay value N at every initialization period; and generating the pseudo random sequence by summing the first output sequence, the second output sequence and the third output sequence bit by bit through a modulo 2 operation.

An exemplary embodiment of the present invention also discloses a method for generating pseudo random sequence in a wireless communication system, comprising generating a first output sequence by inputting a fixed initial value to a first linear feedback shift register (LFSR) having m blocks at every initialization period; generating a second output sequence by inputting one of m-bit initial values to a second LFSR having m blocks at every initialization period; generating a third output sequence by inputting one of m-bit initial values to a third LFSR having m blocks at every period; and generating the pseudo random sequence by summing the first output sequence, the second output sequence and the third output sequence bit by bit through a modulo 2 operation.

An exemplary embodiment of the present invention also discloses an apparatus to generate pseudo random sequence in a wireless communication system, comprising a first linear feedback shift register (LFSR), a second LSFR, and a third LFSR, each of which has m blocks; a first initial value mapper to input a fixed initial value to the first LFSR at every initialization period; a second initial value mapper to input one of m-bit initial values to the second LFSR at every initialization period; a third initial value mapper to input a predetermined initial value to the third LFSR at every initialization period; an N delay operator to delay sequences output from the third LFSR receiving the initial value from the third initial value mapper by N clocks for a given delay value N; and a modulo 2 operator to sum the first output sequence, the second output sequence and the third output sequence bit by bit through a modulo 2 operation.

An exemplary embodiment of the present invention also discloses an apparatus to generate pseudo random sequence in a wireless communication system, comprising a first linear feedback shift register (LFSR), a second LFSR, and a third LFSR, each of which has m blocks; a first initial value mapper to input a fixed initial value to the first LFSR at every initialization period; a second initial value mapper to input one of m-bit initial values to the second LFSR at every initialization period; a third initial value mapper to input one of m-bit initial values to the second LFSR at every initialization period; and a modulo 2 operator to sum the first output sequence, the second output sequence and the third output sequence bit by bit through a modulo 2 operation.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention

DETAILED DESCRIPTION OF THE
ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Before describing exemplary embodiments of this invention, in order to clarify the configuration and effects of the exemplary embodiments, a Gold sequence method which is compared to the exemplary embodiments of this disclosure will be described.

As described above, in the case of an m-sequence, it may be generated by a primitive polynomial of degree m over GF (2), and this may be implemented by using a Linear Feedback Shift Register (LFSR).

An m-sequence $x_a(i)$ generated through an LFSR a, is generated by a primitive polynomial of Equation 1.

$$h_a(x) = x^m + h_{m-1}^{(a)} x^{m-1} + h_{m-2}^{(a)} x^{m-2} + \ldots + h_2^{(a)} x^2 + h_1^{(a)} x^1 + 1$$ [Equation 1]

In the same way, an m-sequence $x_b(i)$, which is generated through an LFSR b and different from $x_a(i)$, is generated from a primitive polynomial of Equation 2.

$$h_b(x) = x^m + h_{m-1}^{(b)} x^{m-1} + h_{m-2}^{(b)} x^{m-2} + \ldots + h_2^{(b)} x^2 + h_1^{(b)} x^1 + 1$$ [Equation 2]

For example, in the case of m=5, a total of six primitive polynomials exist. When the two primitive polynomials $h_a(x) = x^5 + x^2 + 1$ and $h_b(x) = x^5 + x^4 + x^3 + x^2 + 1$ are selected respectively, therefrom and the LFSR a and LFSR b are implemented by using the two primitive polynomials, two different m-sequences $x_a$=(00001001011001111110001101110101) and $x_b$=(00010101101000011001001111110111) having a length of $2^5-1=31$ are generated respectively.

A Gold sequence is generated from a preferred pair of arbitrary m-sequences. Here, when it is assumed that a sequence a is an arbitrary m-sequence having a period of $N=2^m-1$, in the case where m is not the power of 2, a sequence b has a sampler $f=2^k+1$ or $f=2^{2k}-2^k-1$ for an arbitrary k which allows m/gcd(m,k) to be odd, and is sampled from the sequence a, the two m-sequences a and b having a period of $N=2^m-1$ have a three-valued cross-correlation, and theses sequences a and b are called the preferred pair of m-sequences. For any m which is not a multiple of 4, in the case of the sampler $f=1+2^{\lfloor(m+2)/2\rfloor}$, a preferred pair of m-sequences always exists.

For the preferred pair of m-sequences a and b, a Gold sequence G(a,b) is represented by the following equation:

$$G(a,b) = \{a, b, a \oplus b, a \oplus Tb, a \oplus T^2b, \ldots, a \oplus T^{N-1}b\},$$ [Equation 3]

where T means a shift operator, and $\oplus$ means a modulo 2 operation. G(a,b) includes $M=2^m+1$ different sequences having a period of $N=2^m-1$. Here, M is generally called a size of a sequence set.

G(a,b) may be generated by the polynomial $h(x)=h_a(x) \cdot h_b(x)$, and $h_a(x)$ and $h_b(x)$ correspond to the primitive polynomials for generating the m-sequences a and b, respectively, as represented by Equations 1 and 2.

Therefore, the Gold sequence G(a,b) may generate by generating the m-sequence a from the simplest (the number of terms is smallest) primitive polynomial $h_a(x)$ for an arbitrary m, generating the m-sequence b having a primitive polynomial $h_b(x)$ to allow the two sequences a and b to be the preferred pair of m-sequences by sampling the sequence a with a sampler f, and using Equation 3.

This may be implemented by an apparatus having two LFSRs. Specifically, the LFSR a and the LFSR b are units for generating the m-sequences a and b and are added bit by bit through a modulo 2 operator. Here, as shown in Equation 3, different Gold sequences are generated because a sequence obtained by shifting the sequence b by T to the fixed sequence a is added bit by bit using the modulo 2 operation. This may be implemented by fixing an initialization value of each block of the LFSR constructing the sequence a and changing an initialization value of each block of the LFSR constructing the sequence b. For example, b=(00010101101000011001001111110111) exemplified above is a sequence generated from $h_b(x)=x^5+x^4+x^3+x^2+1$ (m=5) and may be generated by setting the initial value of each block of the LFSR to 00010. Similarly, Tb, $T^2b$, and $T^3b$ may be generated by setting their initial values to 00101, 01010, and 10101, respectively. In this manner, the values $T^{N-1}b$ ($N=2^5-1=31$) in b are matched with 31 initial values from 00001 to 11111 one by one.

A process for generating a scrambling code using the Gold sequence method in a 3GPP LTE system is described as follows. A Gold sequence G(a,b) is implemented as follows. For m=31, an m-sequence a is generated as $h_a(x)=x^{31}+x^3+1$, which is one of the simplest primitive polynomials among 69,273,666 primitive polynomials. In addition, an m-sequence b having a primitive polynomial $h_b(x)=x^{31}+x^3+x^2+x+1$ to be a preferred pair with the sequence a is generated by sampling the sequence a with a sampler $f=2^k+1=3$ (k=1). Here, for the initial value of the m-sequence a <0, 0, 0, . . . , 0, 0, 1> is substituted without variation, and for the initial value of the m-sequence b 31-bit predetermined values from <0, 0, 0, . . . , 0, 0, 0> to <1, 1, 1, . . . , 1, 1, 1> are substituted. Specifically, the Gold sequence G(a,b) generated through the modulo 2 operator from the predetermined initial value corresponding to 31 bits of the m-sequence b generates $2^{31}$ different scrambling codes, and these are used for identifying mobile station-specific and cell-specific system information corresponding to 31 bits.

Here, in the standard of the 3GPP LTE system, 31-bit information used for identifying mobile station-specific and cell-specific identification information is shown in Table 1 displaying each physical channel and each physical signal, as follows.

TABLE 1

| | Initialization Value of LFSR b |
|---|---|
| Physical Channel | |
| PDSCH | Cell_ID + Subframe_Num · $2^9$ + Stream_ID · $2^{13}$ + UE_ID · $2^{14}$ |
| PMCH | MBSFN_Area_ID + Subframe_Num · $2^9$ |
| PDCCH | Cell_ID + Subframe_Num · $2^9$ |
| PCFICH | Cell_ID + Subframe_Num · $2^9$ |
| PHICH | Cell_ID + Subframe_Num · $2^9$ |
| PBCH | Cell_ID |
| PUCCH | Cell_ID + Subframe_Num · $2^9$ + UE_ID · $2^{14}$ |
| PUSCH | Cell_ID + Subframe_Num · $2^9$ + UE_ID · $2^{14}$ |
| Physical Signal | |
| Cell Specific RS | Cell_ID + Subframe_Num · $2^9$ + OFDM_Symbol_Num · $2^{13}$ |
| MBSFN RS | MBSFN_Area_ID + Subframe_Num · $2^9$ + OFDM_Symbol_Num · $2^{13}$ |
| UE Specific RS | Cell_ID + Subframe_Num · $2^9$ + UE_ID · $2^{13}$ |

As shown in Table 1, as mobile station-specific and cell-specific system information of 31 bits is at the maximum, which is identified by $2^{31}$ scrambling codes, there is a mobile station ID (16 bit), a cell ID (9 bit), a subframe number, a stream ID, a Multimedia Broadcast and Multicast Service (MBMS) over Single-Frequency Network (MBSFN) area ID, an Orthogonal frequency-division multiplexing (OFDM) symbol number, and the like. These are slightly different depending on physical channels and physical signals, however, applied to all of the physical channels and physical signals in the same manner.

As described above, in the case of using the Gold sequence method, $2^m+1$ (about m bits) different scrambling codes may be generated from the two LFSRs (LFSRs having two m-sequences with primitive polynomials of degree m) each of which has m blocks (block or box), and a maximum cross-correlation value between scrambling codes of which a period (length) is $2^m-1$ is $2^{\lfloor(m+2)/2\rfloor}+1$.

In order to maximize the sizes of different scrambling codes while reducing or maintaining the maximum cross-correlation value, a method of generating scrambling code using two LFSRs, like the Gold sequence method, may be considered. Examples of the method may include a Gold-like sequence, a dual-BCH sequence or Double-error-correcting BCH code, and Small sets of Kasami sequence. However, the sequence size and the maximum cross-correlation value in some cases of these methods are substantially the same as compared with the Gold sequence. In some other case of above methods, the maximum cross-correlation value has a lower value, but the sequence size is lower. Since the size of a sequence is lower, there may be no further advantage in terms of the requirements of the system as compared with the Gold sequence method.

Therefore, embodiments of this disclosure propose a method and an apparatus for generating pseudo random sequence having a larger size by using three or more LFSRs and distributing initial values and delay values depending on a mobile station-specific and cell-specific system information, while maintaining a maximum cross-correlation value. According to the exemplary embodiments, Large sets of Kasami sequence developed from Small sets of Kasami sequence, a t-error-correcting BCH code developed from a Dual-BCH sequence or Double-error-correcting BCH code, and Modified (or Extended) Gold or Kasami sequences are applied.

Hereinafter, the apparatus for generating a pseudo random sequence in a broadband wireless communication system according to exemplary embodiments will be described in more detail with reference to FIG. 1, FIG. 2, and FIG. 3.

Figure 1:
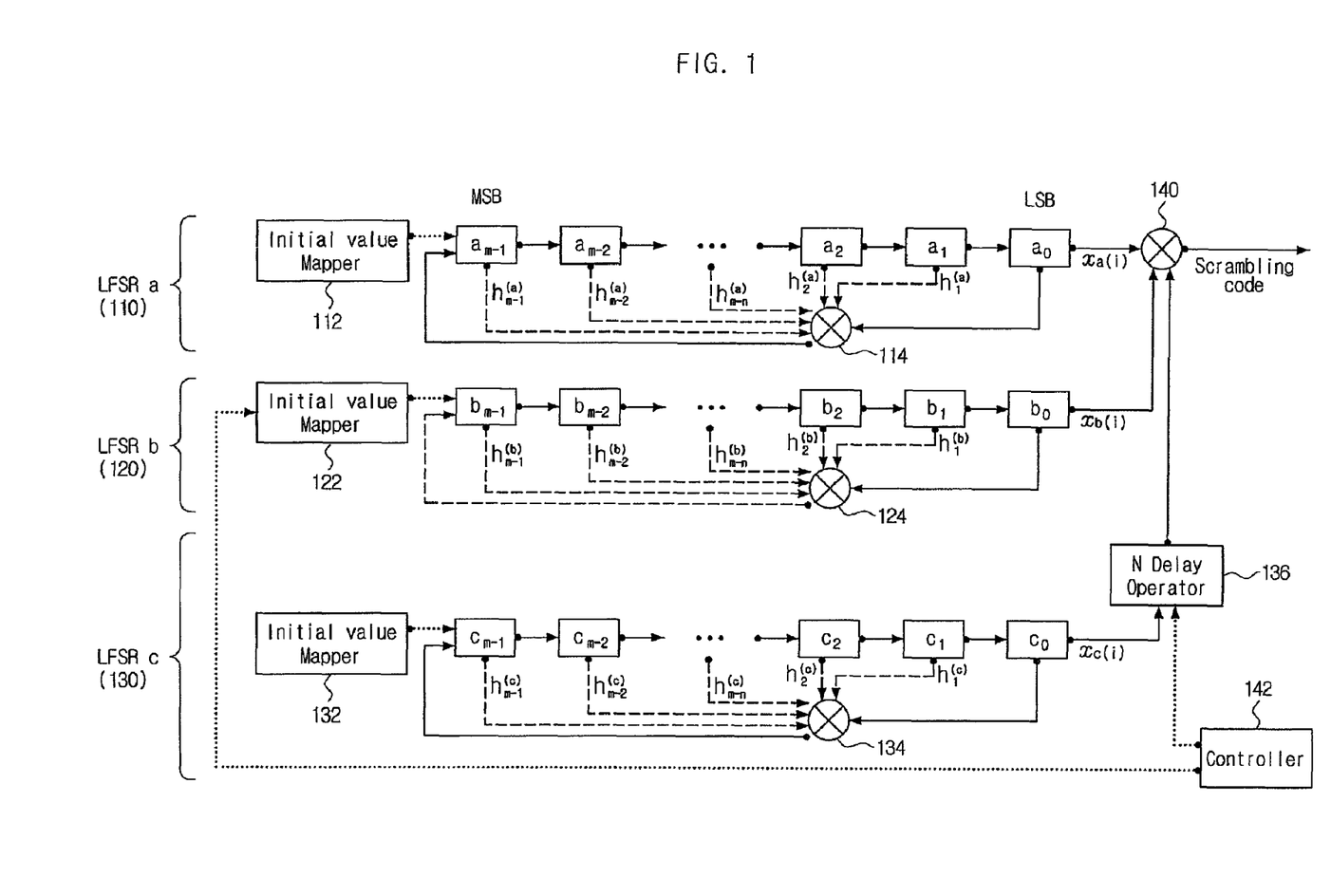
FIG. 1 is a diagram illustrating the configuration of an apparatus for generating pseudo random sequence in a broadband wireless communication system according to an exemplary embodiment of the present invention.

FIG. 1 is a diagram illustrating the configuration of an apparatus for generating scrambling codes in a broadband wireless communication system according to an exemplary embodiment of the present invention, which is for generating pseudo random sequence using Large sets of Kasami sequence. In the case of the method using Large sets of Kasami sequence, as compared with the Gold sequence method, scrambling code having a larger size while maintaining a maximum cross-correlation value may be generated.

Large sets of Kasami sequence may be generated by a polynomial $h(x)=h_a(x) \cdot h_b(x) \cdot h_c(x)$. Here, $h_a(x)$, $h_b(x)$, and $h_c(x)$ are polynomials generating sequences a, b, and c, respectively, and represented by Equation 4:

$$h_a(x)=x^m+h_{m-1}^{(a)}x^{m-1}+h_{m-2}^{(a)}x^{m-2}+\ldots+h_2^{(a)}x^2+h_1^{(a)}x^1+1$$

$$h_b(x)=x^m+h_{m-1}^{(b)}x^{m-1}+h_{m-2}^{(b)}x^{m-2}+\ldots+h_2^{(b)}x^2+h_1^{(b)}x^1+1$$

$$h_c(x)=x^m+h_{m-1}^{(c)}x^{m-1}+h_{m-2}^{(c)}x^{m-2}+\ldots+h_2^{(c)}x^2+h_1^{(c)}x^1+1 \quad \text{[Equation 4]}$$

where, $h_a(x)$ corresponds to a primitive polynomial for generating an m-sequence a, the sequence b is a sequence sampled from the sequence a with a sampler $f=1+2^{\lfloor(m+2)/2\rfloor}$, and the sequence c is a sequence sampled from the sequence a with a sampler $f=1+2^{m/2}$. Here, Large sets of Kasami sequence $K_L(a,b,c)$ are represented by Equation 5:

1) $m \equiv 2 \pmod 4$ (ex. m=30)

$$K_L(a,b,c)=\{G(a,b), G(a,b)\oplus c, G(a,b)\oplus Tc, \ldots, G(a,b)\oplus T^{2^{m/2}-2}c\}$$

2) $m \equiv 0 \pmod 4$ (ex. m=32)

$$K_L(a,b,c)=\{H(a,b), H(a,b)\oplus c, H(a,b)\oplus Tc, \ldots, H(a,b)\oplus T^{2^{m/2}-2}c;$$

$$b^{(0)}\oplus c, b^{(0)}\oplus Tc, \ldots, b^{(0)\oplus T(2^{m/2}-1)/3-1}c;$$

$$b^{(1)}\oplus c, b^{(1)}\oplus Tc, \ldots, b^{(1)\oplus T(2^{m/2}-1)/3-1}c;$$

$$b^{(2)}\oplus c, b^{(2)}\oplus Tc, \ldots, b^{(2)\oplus T(2^{m/2}-1)/3-1}c\} \quad \text{[Equation 5]}$$

where, $G(a,b)$ is a Gold sequence, $H(a,b)$ is a Gold-like sequence transformed from the Gold sequence, $b^{(k)}$ is a sequence sampled from $T^k a$ with a sampler $f=1+2^{m/2}$, T is a shift operator, and $\oplus$ is a modulo 2 operation. $K_L(a,b,c)$ has a period of $N=2^m-1$, and includes different sequences of which the number is $M=2^{m/2}(2^m+1)$ or $M=2^{m/2}(2^m+1)-1$ in the case of $m \equiv 2 \pmod 4$ (for example, m=30) or $m \equiv 0 \pmod 4$ (for example, m=32), respectively. Here, a maximum cross-correlation value between pseudo random sequence, which may have a significant affect on the performance of pseudo random sequence, becomes $2^{\lfloor(m+2)/2\rfloor}+1$, and this value may be the same as that in the above-mentioned Gold sequence method.

Pseudo random sequence of Large sets of Kasami sequence may be implemented by an apparatus connecting three LFSRs in parallel and distributing the mobile station-specific and cell-specific system information to some of the LFSRs as initial values and delay values.

Referring to FIG. 1, the apparatus for generating pseudo random sequence according to an exemplary embodiment may be applied to a wireless communication system, and more particularly, to a next-generation broadband wireless communication system, which requires pseudo random sequence having larger sizes. The apparatus includes a Linear Feedback Shift Register (LFSR) a 110 connected to a first initial value mapper 112, an LFSR b 120 connected to a second initial value mapper 122, an LFSR c 130 cooperative with a third initial value mapper 132 and an N delay operator 136, a modulo 2 operator 140, and a controller 142.

The LFSR a 110, the LFSR b 120, and the LFSR c 130 are units for generating sequences a, b, and c, respectively, and each of them has m blocks. The sequences a, b, and c, which are output from the LFSR a 110, the LFSR b 120, and the LFSR c 130, respectively, are added bit by bit through the modulo 2 operator 140, to generate pseudo random sequence. Here, $h_a(x)$, $h_b(x)$, and $h_c(x)$ of Equation 4 may be represented as the LFSR a 110, the LFSR b 120, and the LFSR c 130, respectively. Coefficients $h_{m-n}(x)$ of terms of each polynomial are 1 or 0. When the coefficient matched with each of blocks in the LFSRs 110, 120, and 130 is 1, the corresponding blocks are connected to the modulo 2 operators 114, 124, and 134 in the LFSR a 110, LFSR b 120, and LFSR c 130, respectively. When the coefficient is 0, the corresponding blocks are not connected thereto.

The modulo 2 operators 114, 124, and 134 provided in the LFSR a 110, LFSR b 120, and LFSR c 130, respectively, add all of state values of the blocks in the respective LFSR a 110, LFSR b 120, and LFSR c 130 through the modulo 2 operation at every clock, and the values are fed back to the first blocks in each respective LFSR a 110, LFSR b 120, and LFSR c 130.

Here, $h_a(x)$ corresponds to the primitive polynomial for generating an m-sequence a as described above, b having a polynomial $h_b(x)$ is a sequence sampled from the sequence a with a sampler $f=1+2^{\lfloor (m+2)/2 \rfloor}$, c having a polynomial $h_c(x)$ is a sequence sampled from the sequence a with a sampler $f=1+2^{m/2}$. As $h_a(x)$, a polynomial having the smallest number of terms may be selected from among primitive polynomials for generating the m-sequence a for the convenience of operation. For example, in the case of m=30(m≡2(mod 4)), 17,820,000 primitive polynomials exist, and $x^{30}+x^6+x^4+x+1$, $x^{30}+x^8+x^4+x+1$, $x^{30}+x^8+x^6+x^4+1$, and the like, each of which consists of five terms may be selected therefrom as $h_a(x)$ for the LFSR a 110. In the case of m=32(m≡0(mod 4)), 67,108,864 primitive polynomials exist, and $x^{32}+x^7+x^6+x^2+1$, $x^{32}+x^8+x^5+x^2+1$, $x^{30}+x^9+x^3+x^2+1$ and the like, each of which consists of five terms may be selected therefrom as $h_a(x)$ for the LFSR a 110.

The LFSR a 110, the LFSR b 120, and the LFSR c 130 may be implemented by using the polynomials $h_a(x)$, $h_b(x)$, and $h_c(x)$ obtained as described above. However, ultimately, different pseudo random sequences used by a system may be generated by adding a sequence obtained by shifting the sequence c by T to the Gold sequence G(a,b) or the Gold-like sequence H(a,b), as represented in Equation 5 through the modulo 2 operation. This may be implemented by a method of fixing to the same value every time, the initial value of the first initial value mapper 112 for mapping an initial value to each block of the LFSR a 110, changing to a different value, the initial value of the second initial value mapper 122 for mapping an initial value of each block of the LFSR b 120, fixing to the same value every time, the initial value of the third initial value mapper 130 for mapping an initial value of each block of the LFSR c 130, but substituting different values of about m/2 bits changed by the N delay operator 136.

Therefore, the first initial value mapper 112 inputs a fixed single initial value to the LFSR a 110 at every initialization period, the second initial value mapper 122 inputs a different initial value of m bits at the maximum to the LFSR b 120 at every initialization period. In addition, when the third initial value mapper 132 inputs a fixed single initial value to the LFSR c 130 at every initialization period, the N delay operator 136 receives bits output from LFSR c 130 to which the third initial value mapper 132 inputs the initial value, and gives different delay values of m/2 bits at the maximum.

Here, the controller 142 controls the second initial value mapper 122 on the basis of the specific identification information to distribute different initial values of m bits at the maximum, and also controls the N delay operator 136 to distribute different delay values of m/2 bits at the maximum. Specifically, the controller 142 distributes different m-bit initial values input to the LFSR b 120 on the basis of some information of which the sum of total information bits is between 1 and m bits among specific identification information, and also distributes delay values given for the sequences output from LFSR c 130 on the basis of the remaining information of which the sum of total information bits is between 0 and m/2 bits among specific identification information.

The case of m=30(m≡2(mod 4)) and the case of m=32(m≡0 (mod 4)) are exemplified to describe operations in detail.

In the case of m=30, as described above, a polynomial having the smallest number of terms is selected from among 17,820,000 primitive polynomials in the case of m=30. $x^{30}+x^6+x^4+x+1$ is an example thereof. This primitive polynomial is regarded as $h_a(x)$, the LFSR a 110 for generating the sequence a is implemented by using $h_a(x)$, and the LFSR b 120 is implemented by using the sequence b expressed as a polynomial $h_b(x)$ sampled from the sequence a with a sampler $f=1+2^{\lfloor (m+2)/2 \rfloor}=1+2^{16}$. In addition, the LFSR c 130 is implemented by using a sequence c expressed as a polynomial $h_c(x)$ sampled from the sequence a with a sampler $f=1+2^{m/2}=1+2^{15}$. The modulo 2 operators 114, 124, and 134 provided in LFSR a 110, LFSR b 120, and LFSR c 130, respectively, perform the modulo 2 operation on all state values of each block connected to the modulo 2 operators 114, 124, and 134 at every clock, and the result values are fed back to their first blocks (MSBs) of each respective LSFR a 110, LFSR b 120, and LFSR c 130. Values $x_a(i)$, $x_b(i)$, and $x_c(i)$ output from their last blocks (LSBs) of the LFSR a 110, LFSR b 120, and LFSR c 130, respectively, are added bit by bit through the modulo 2 operator 140, and the values output through the modulo 2 operator 140 are arranged to be pseudo random sequence.

In the case of m=32, similarly, a polynomial having the smallest number of terms is selected as $h_a(x)$ from among 67,108,864 primitive polynomials such as $x^{32}+x^7+x^6+x^2+1$. Except that the sequence b expressed as a polynomial $h_b(x)$ is a sequence sampled from a sequence a with a sampler $f=1+2^{\lfloor (m+2)/2 \rfloor}=1+2^{17}$ and a sequence c expressed as a polynomial $h_c(x)$ is a sequence sampled from a sequence a with a sampler $f=1+2^{m/2}=1+2^{16}$, the remaining operations are the same as those in the case of m=30.

Here, every initialization period at which the initial values are input to each respective LFSR a 110, LFSR b 120, and LFSR c 130 are slightly changed depending on physical channels or physical signals of an uplink or a downlink, and examples thereof may include a subframe period, a radio frame period, an OFDM symbol period, a slot period, and a code block period.

The initial value mappers 112, 122, and 132 for initializing the state values of the blocks in LFSR a 110, LFSR b 120, and LFSR c 130 at every initialization period, respectively, have the following values as the initialization values used for mapping. The first initial value mapper 112 for the LFSR a 110 maps a predetermined fixed value at every initialization period. An example of the value is <0, 0, 0, . . . , 0, 0, 1> or <1, 0, 0, . . . , 0, 0, 0>. The second initial value mapper 122 for the LFSR b 120 maps various initialization values of total 30 bits (32 bits in the case of m=32) from <0, 0, 0, . . . , 0, 0, 0> to <1, 1, 1, . . . , 1, 1, 1> at every initialization period. In this case, which one is mapped from among total $2^{30}$ ($2^{32}$ in the case of m=32) initialization values corresponding to 30 bits is determined by the controller 142.

Ultimately, as the main factors for generating scrambling code having a larger size than that of a Gold sequence, there is a parallel structure with the LFSR c 130 implemented as the sequence c expressed as the polynomial $h_c(x)$, and a control method using the structure. As a result, different pieces of mobile station-specific and cell-specific system information of total (m/2)=15 bits (16 bits in the case of m=32) can be more accurately identified.

Similarly to the LFSR b 120, various values of (m/2)=15 bits (16 bits in the case of m=32) are mapped as the initialization values of each block of the LFSR c 130 through the third initial value mapper 132. However, only (m/2)=15 bits (16 bits in the case of m=32) among total m=30 bits (or 32 bits) available are used as the initialization values, and for selective substitution, operations of storing in a memory all $2^{m/2}=2^{15}$ ($2^{16}$ in the case of m=32) initialization values having a length of 30 bits (or 32 bits) and reading a predetermined one of the values from the memory at every initialization period are performed. This results in significantly lower system speed.

In order to overcome this problem, an exemplary embodiment of the present invention provides a method of allowing the third initial value mapper 132 for the LFSR c 130 to map a predetermined fixed value at every initialization period similarly to the LFSR a 110, and instead, substituting therefor about (m/2)=15 bits (16 bits in the case of m=32) different values changed by the N delay operator 136. Here, the fixed initialization value applied to the third initial value mapper 132 is an initial value of 30 bits of the sequence c sampled from the sequence a with a sampler $f=1+2^{m/2}=1+2^{15}$ ($f=1+2^{16}$ in the case of m=32). A sequence generated from this initial value of 30 bits (32 bits in the case of m=32) corresponds to the sequence c.

In this case, after storing the sequence c itself, its shifted value may be used. However, in the case of m=30, its length is $2^m-1=2^{30}-1$ and over 100 Mbytes. This means that there is a physical limitation to store sequence c itself in the memory, and only the initial value of 30 bits (32 bits in the case of m=32) is re-generated. In the case where the sequence c generated as described above is delayed by N clocks through the N delay operator 136 to be input to the modulo 2 operator 140, this may be numerically expressed as $T^N c$, and by this, Large sets of Kasami sequence $K_L(a,b,c)$ represented by Equation 5 may be implemented. Here, the maximum value of N is $2^{m/2}=2^{15}$ ($2^{16}$ in the case of m=32) clocks, and in consideration of the current hardware speed, this is a very low time as compared with the initialization period. In the case where only the LFSR c 130 is operated before every initialization, practically, values output from LFSR a 110, LFSR b 120, and LFSR c 130 may be used simultaneously at every initialization start point as if there is no delay. Accordingly, this is more advantageous in terms of hardware complexity and calculation speed than a method of storing initialization values described above and reading one by one at every initialization period.

Therefore, the mobile station-specific and cell-specific system information of total 45 bits (48 bits in the case of m=32) may be identified through $2^{45}$ ($2^{48}$ in the case of m=32) scrambling codes generated by the apparatus illustrated in FIG. 1, the information including 30 bits (32 bits in the case of m=32) through the second Initial value mapper 122 of the LFSR b 120 and 15 bits (16 bits in the case of m=32) through the N delay operator 136 of the LFSR c 130. In this case, receiving the mobile station-specific and cell-specific system information of 45 bits (48 bits in the case of m=32) at the maximum and distributing and inputting the information value to the second initial value mapper 122 and the N delay operator 136 are performed by the controller 142.

Here, when a set having total $2^m$ different initial values of which a length from <0, 0, 0, . . . , 0, 0, 0> to <1, 1, 1, . . . , 1, 1, 1> is m as elements is regarded as A, with regard to M (0<M≦2m) determined on the basis of the number of cases of the specific system information distributed to the LFSR b 120, the different m-bit initial values input to the LFSR b 120 are determined as one of elements of subset of the set A, which have M elements. In addition, with regard to M' (0≦M'≦$2^{m/2}$) determined on the basis of the number of cases of the specific system information distributed to the LFSR c 130, the delay value N is determined as one of total M' different delay values from 0 to M'−1.

The mobile station-specific and cell-specific system information includes a user equipment(mobile station) identification (UE ID), a cell ID, a cell group ID, a component carrier (CC) ID, a component carrier (CC) offset, a relay node ID, a Home node B (HeNB) ID, a system frame number, a subframe number, a slot number, a stream ID, an MBSFN area ID, an OFDM symbol number, and the like. An UE ID identified as 16 bits in an existing 3GPP LTE and a cell ID identified as 9 bits may be extended as the system is developed.

Specifically, the basic principle for distributing the mobile station-specific and cell-specific system information through the controller 142 is as follows: First, mobile station-specific and cell-specific system information of 30 bits or less (32 bits in the case of m=32) is identified by being input as various initial values of the second initial value mapper 122 connected to the LFSR b 120. Then, the mobile station-specific and cell-specific system information of remaining 15 bits or less (16 bits in the case of m=32) is identified by being input as delay values through the N delay operator 136. A few specific examples are shown in Table 2 as follows:

TABLE 2

| Case | Initial Value Mapper 122 32 bits available at the maximum | N Delay Operator 136 16 bits available at the maximum |
| --- | --- | --- |
| 1 | UE ID(16 bits or higher), Cell ID(9 bits or higher) | other than UE ID and Cell ID |
| 2 | other than Cell ID | Cell ID (9 bits or higher) |
| 3 | UE ID(16 bits or higher) | other than UE ID |

In addition to the method as shown in Table 2, the method of distributing the mobile station-specific and cell-specific system information input to the second initial value mapper 122 and the N delay operator 136 through the controller 142 may be applied on the above-mentioned basic principle in various manners. Here, for faster system operation, as in Case 1 of Table 2, with priority to the information commonly applied to each physical channel and each physical signal of an uplink and a downlink, the mobile station-specific and cell-specific system information of nearly 30 bits at the maximum (32 bits in the case of m=32) is input as the initial value of the second initial value mapper 122 for the LFSR b 120 to be identified, and the remaining mobile station-specific and cell-specific system information is input as the delay value through the N delay operator 136 to be identified. This reduces the maximum value of the delay value N, which is advantageous.

In addition, in the case where values such as the subframe number or the OFDM symbol number, which may be predicted by a system, are input as delay values through the N delay operator 136 to be identified, only the LFSR c 130 is operated in advance immediately before every initialization period to enable the N delay operator 136 to perform a delay operation by a certain extent, and practically, at every initialization start point, as if there is no delay, values output from LFSR a 110, LFSR b 120, and LFSR c 130 may be used simultaneously. Accordingly, faster system operation is possible.

As described above, as shown in FIG. 1, the apparatus and the method of generating pseudo random sequence by LFSR a 110, LFSR b 120, and LFSR c 130 using Large sets of Kasami sequence developed from Small sets of Kasami sequence, and the technique for distributing mobile station-specific and cell-specific system information through the initialization and delay method, may be implemented.

Figure 2:
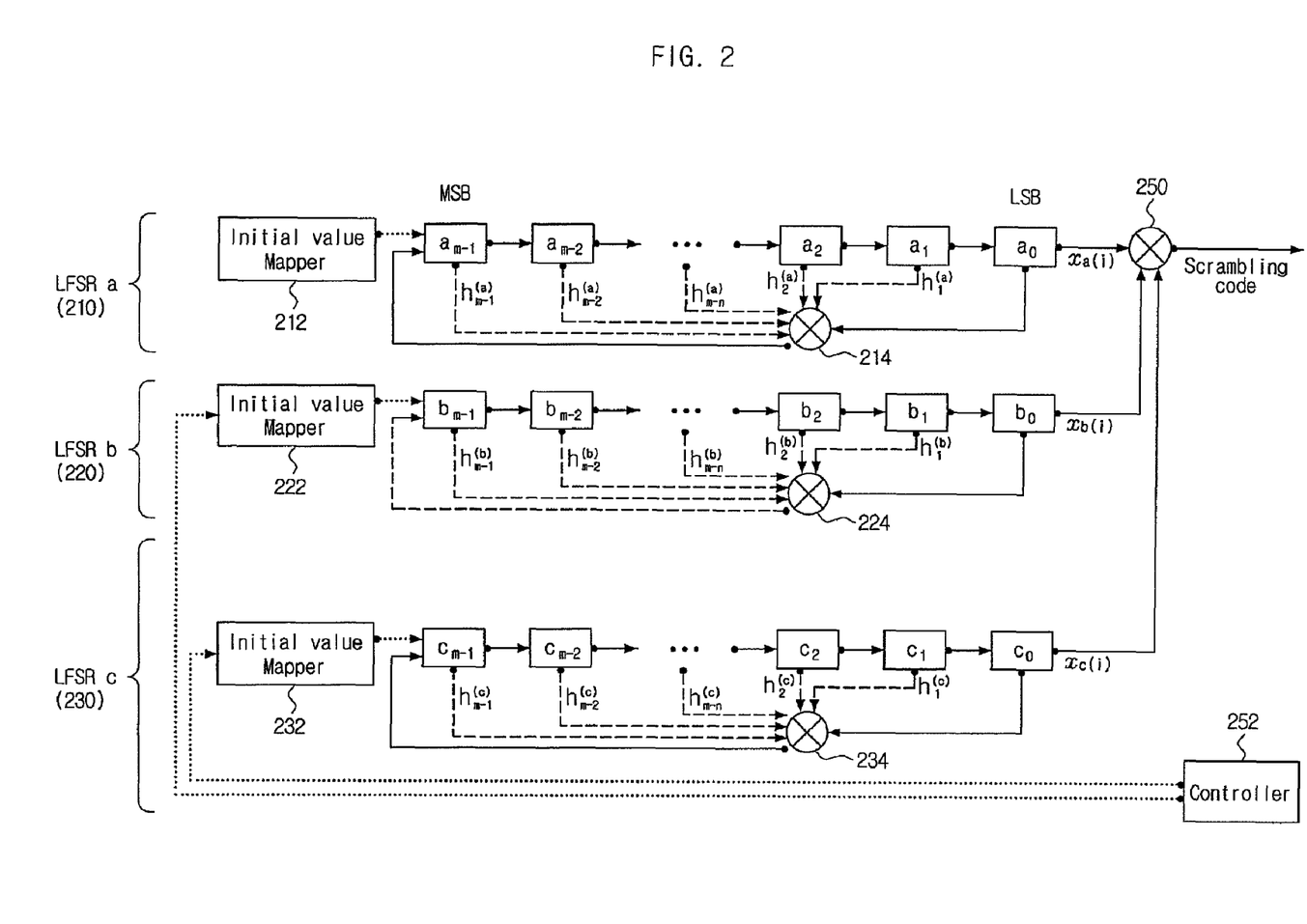
FIG. 2 is a diagram illustrating the configuration of an apparatus for generating pseudo random sequence in a broadband wireless communication system according to an exemplary embodiment of the present invention.

FIG. 2 is a diagram illustrating the configuration of an apparatus for generating pseudo random sequence in a broadband wireless communication system according to another exemplary embodiment of the present invention. In addition to the method using Large sets of Kasami sequence having a larger size as illustrated in FIG. 1, as the method of generating pseudo random sequence by using LFSR a 210, LFSR b 220, and LFSR c 230, there is a method using a t-error-correcting BCH code (triple-error-correcting BCH code in the case of t=3, t is a natural number equal to or greater than 3) developed from a double-error-correcting BCH code, or Modified (or Extended) Gold or Kasami sequences.

FIG. 2 is a diagram illustrating the apparatus of generating pseudo random sequence using a t-error-correcting BCH code or Modified (or Extended) Gold or Kasami sequences.

Referring to FIG. 2, the apparatus of generating pseudo random sequence according to another exemplary embodiment includes LFSR a 210, LFSR b 220, and LFSR c 230 having modulo 2 operators 214, 224, and 234, respectively, each of which has m blocks, a first initial value mapper 212, a second initial value mapper 222, and a third initial value mapper 232 for inputting initial values to respective LFSR a 210, LFSR b 220, and LFSR c 230, a modulo 2 operator 250, and a controller 252. In FIG. 2, configurations and operations of the elements in FIG. 2 are substantially the same as those in FIG. 1 except for the following two facts.

Here, polynomials $h_a(x)$, $h_b(x)$, and $h_c(x)$ for implementing the LFSR a 210, the LFSR b 220, and the LFSR c 230 are determined depending on whether they are generated by the t-error-correcting BCH code (t=3) or the Modified (or Extended) Gold or Kasami sequences. In this aspect, the apparatus is different from that of FIG. 1, which determines the polynomials $h_a(x)$, $h_b(x)$, and $h_c(x)$ depending on the Large sets of Kasami sequence.

In addition, the controller 142 of FIG. 1 receives the mobile station-specific and cell-specific system information, and distributes and inputs the information values to the second initial value mapper 122 and the N delay operator 136. On the other hand, the controller 252 of FIG. 2 receives the mobile station-specific and cell-specific system information, and distributes and inputs the information values to the second initial value mapper 222 and the third initial value mapper 232 of LFSR b 220 and LFSR c 230 respectively, except for the first initial value mapper 212 for the LFSR a 210. In addition, except for the first initial value mapper 212 for LFSR a 210, the second initial value mapper 222 and the third initial value mapper 232 do not use fixed values, but perform mapping on various initial values of total m bits from <0, 0, 0 . . . , 0, 0, 0> to <1, 1, 1, . . . , 1, 1, 1>, at every initialization period.

To the respective LFSR a 210, the LFSR b 220, and the LFSR c 230 each of which has m blocks, the first initial value mapper 212 inputs a fixed initial value to the LFSR a 210 at every initialization period, the second initial value mapper 222 inputs a different initial value of m bits at the maximum to the LFSR b 220 at every initialization period, and the third initial value mapper 232 inputs a different initial value of m bits at the maximum to the LFSR c 230 at every initialization period. The controller 252 can identify the mobile station-specific and cell-specific system information of m bits at the maximum through the second initial value mapper 222 of the LFSR b 220, and of m bits at the maximum through the third initial value mapper 232 of the LFSR c 230, that is, total 2m bits. For example, as shown in Table 2, the controller 252 distributes and identifies specific information of m bits at the maximum among the mobile station-specific and cell-specific system information such as a UE ID or a Cell ID to the second initial value mapper 222, and distributes and identifies the remaining information except for the information distributed through the second initial value mapper 222, to the third initial value mapper 232. If the different initial values of m bits input to LFSR b 220 are distributed on the basis of some information of which the sum of total information bits is between 1 to m bits among the specific identification information, the different initial values of m bits input to the LFSR c 230 are distributed on the basis of the remaining information of which the sum of total information bits is between 0 to m bits among the specific identification information. Here, with regard to a set A having total $2^m$ different initial values of which a length from <0, 0, 0, . . . , 0, 0, 0> to <1, 1, 1, . . . , 1, 1, 1> is m as elements, and M ($0<M\leq 2m$) determined on the basis of the number of cases of the specific identification information distributed to the LFSR b 220, the different m-bit initial values input to the LFSR b 220 may be one of elements of subsets of the set A, which have M elements. In addition, with regard to a set B having total $2^m$ different initial values of which a length from <0, 0, 0, . . . , 0, 0, 0> to <1, 1, 1, . . . , 1, 1, 1> is m as elements, M' ($0\leq M'\leq 2m$) determined on the basis of the number of cases of the specific identification information distributed to the LFSR b 220, the different m-bit initial values input to the LFSR c 230 may be one of elements of subsets of the set A, which have M' elements.

In FIG. 2, the case where t (t=3) LFSR a 210, LFSR b 220, and LFSR c 230 are constructed is exemplified, however, more LFSRs with at greater than 3 may also be constructed. In the case where t LFSRs each of which has m blocks in the apparatus of FIG. 2 are constructed, by using pseudo random sequence generated therefrom, mobile station-specific and cell-specific system information of about total (t−1)·m bits may be identified.

In the case of the Gold sequence method using two LFSRs, mobile station-specific and cell-specific system information of m bits may be identified. In the case of Large sets of Kasami sequence, which use LFSR a 110, LFSR b 120, and LFSR c 130 as illustrated in FIG. 1, mobile station-specific and cell-specific system information of about 1.5m bits may be identified. On the other hand, in the case where LFSR a 210, LFSR b 220, and LFSR c 230 are constructed as illustrated in FIG. 2, mobile station-specific and cell-specific identification system having a larger size of about 2m bits may be identified.

Here, in the case of using a Gold sequence or Large sets of Kasami sequence, maximum cross-correlation values, which have a significant affect on the performance of pseudo random sequences, are the same as $2^{\lfloor (m+2)/2 \rfloor}+1$. However, the maximum cross-correlation value between pseudo random sequences generated by the apparatus of FIG. 2 or the like is greater than the above value about $2^{t-2}$ times. Specifically, in the case of Large sets of Kasami sequence, when the number of LFSRs is increased from 2 to 3, the maximum cross-correlation value is the same as that of the Gold sequence. On the other hand, when the number of LFSRs is three, that is, t=3 in FIG. 2, the maximum cross-correlation value is doubled.

As a result, according to the another exemplary embodiment of FIG. 2, as compared with the exemplary embodiment of FIG. 1, although the number of bits for identifying mobile station-specific and cell-specific system information is increased 1.5 times or twice that of the Gold sequence, and the number of the generated pseudo random sequence is increased by a power of 1.5 or 2, since the maximum cross-correlation value is doubled, this may be optionally applied when a huge number of pieces of mobile station-specific and cell-specific system information are to be identified as long as the degradation in system does not have a significant effect.

Figure 3:
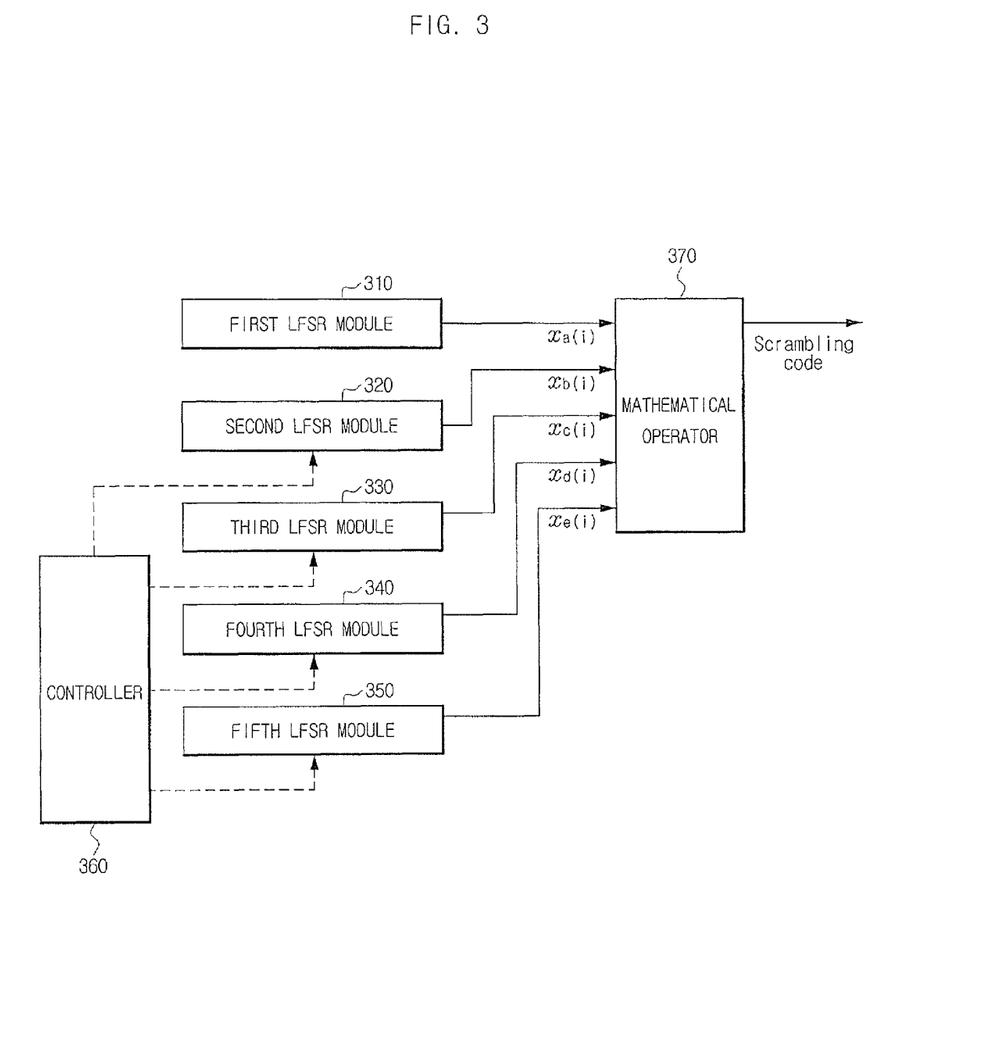
FIG. 3 is a diagram illustrating the configuration of an apparatus for generating pseudo random sequence in a broadband wireless communication system according to an exemplary embodiment of the present invention.

FIG. 3 is a diagram illustrating the configuration of an apparatus for generating pseudo random sequence in a broadband wireless communication system according to an exemplary embodiment of the present invention.

Referring to FIG. 3, the apparatus for generating pseudo random sequence includes five LFSR modules having a first LFSR module 310, a second LFSR module 320, a third LFSR module 330, a fourth LFSR module 340, and a fifth LFSR module 350 arranged in parallel. In FIG. 3, the case where five LFSR modules are constructed is exemplified. However, this disclosure is not limited thereto, and may be applied to any case where the number of LFSR modules is 3 or more.

The first LFSR module 310 is a unit for generating a first output sequence by passing a fixed initial value to the first LFSR having m blocks at every initialization period and is also a component corresponding to the LFSR a 110 or 210 and the first initial value mapper 112 or 212.

The second LFSR module 320 is a unit for generating a second output sequence by passing different initial values of m bits at the maximum at every initialization period to the second LFSR having m blocks at every initialization period and is also a component corresponding to the LFSR b 120 or 220 and second initial value mapper 122 or 222.

The third LFSR module 330 is a unit for generating a third output sequence at the same period as that of the first and second output sequences by using the third LFSR having m blocks, and may be constructed as the LFSR c 130, the third initial value mapper 132, and the N delay operator 136 of FIG. 1, or be constructed using the LFSR c 230 and the third initial value mapper 232 of FIG. 2. The fourth module 340 and the fifth module 350 may be constructed in the same manner as one of the two methods for constructing the third LFSR module 330.

The controller 360 is a component corresponding to the controller 142 of FIG. 1 or the controller 252 of FIG. 2. The controller 360 controls the first LFSR module 310, the second LFSR module 320, the third LFSR module 330, the fourth LFSR module 340, and the fifth LFSR module 350 and has a function of distributing the initial value input to each LFSR or the delay value for bits output from each LFSR in the second LFSR module 320, the third LFSR module 330, the fourth LFSR module 340, and the fifth LFSR module 350. To the first LFSR module 310, a fixed initial value is input at every initialization period.

If the third LFSR module 330, the fourth LFSR module 340, and the fifth LFSR module 350 are constructed in the way the LFSR c 130 of FIG. 1 is constructed, after the controller 360 inputs a fixed initial value to each LFSR in the third LFSR module 330, the fourth LFSR module 340, and the fifth LFSR module 350 at every initialization period, the controller 360 gives different delay values of m/2 bits at the maximum for bits output from each LFSR to generate the third, fourth, and fifth sequences that will be input to a mathematical operator.

On the other hand, if the third LFSR module 330, the fourth LFSR module 340, and the fifth LFSR module 350 are constructed in the way the LFSR c 230 of FIG. 2 is constructed, the controller 360 generates the third, fourth, and fifth output sequences by passing the different initial values of m bits at the maximum through each LFSR in the third LFSR module 330, the fourth LFSR module 340, and the fifth LFSR module 350 at every initialization period.

The mathematical operator 370 is a component corresponding to the modulo 2 operators 140 and 250 of FIG. 1 and FIG. 2, respectively, and has a function of generating pseudo random sequence by adding binary sequences output from each LFSR of the first LFSR module 310, the second LFSR module 320, the third LFSR module 330, the fourth LFSR module 340, and the fifth LFSR module 350 bit by bit. The pseudo random sequence generated through the modulo 2 operation of the mathematical operator 370, constructs binary sequences such as a Large sets of Kasami sequence, a t-error-correcting BCH code (t is a natural number equal to of greater than 3), a Modified or Extended Gold sequence, and a Modified or Extended Kasami sequence.

As described above, in the embodiments, the apparatus and the method of generating pseudo random sequence by three or more LFSRs connected in parallel using Large sets of Kasami sequence, and the method of distributing the mobile station-specific and cell-specific system information through the initialization and delay techniques are implemented. Therefore, as compared with the Gold sequence method in which mobile station-specific an cell-specific system information of about 31 bits may be identified by using pseudo random sequence, different pseudo random sequences of about 48 bits at the maximum may be implemented without a deterioration in the maximum cross-correlation value which has a significant affect on the performance of the pseudo random sequences.

Accordingly, it is possible to generate pseudo random sequence for providing mobile station-specific and cell-specific system information of sufficient bits in a next-generation broadband wireless communication system, which requires a number of different scrambling codes as a frequency band is broadened and a cell radius of, such as, a pico cell and a femto cell is reduced, without a degradation in the performance of the scrambling codes.

Hereinafter, a method of generating pseudo random sequence in a broadband wireless communication system according to an exemplary embodiment of the present invention will be described in detail with reference to FIG. 4 and FIG. 5.

Figure 4:
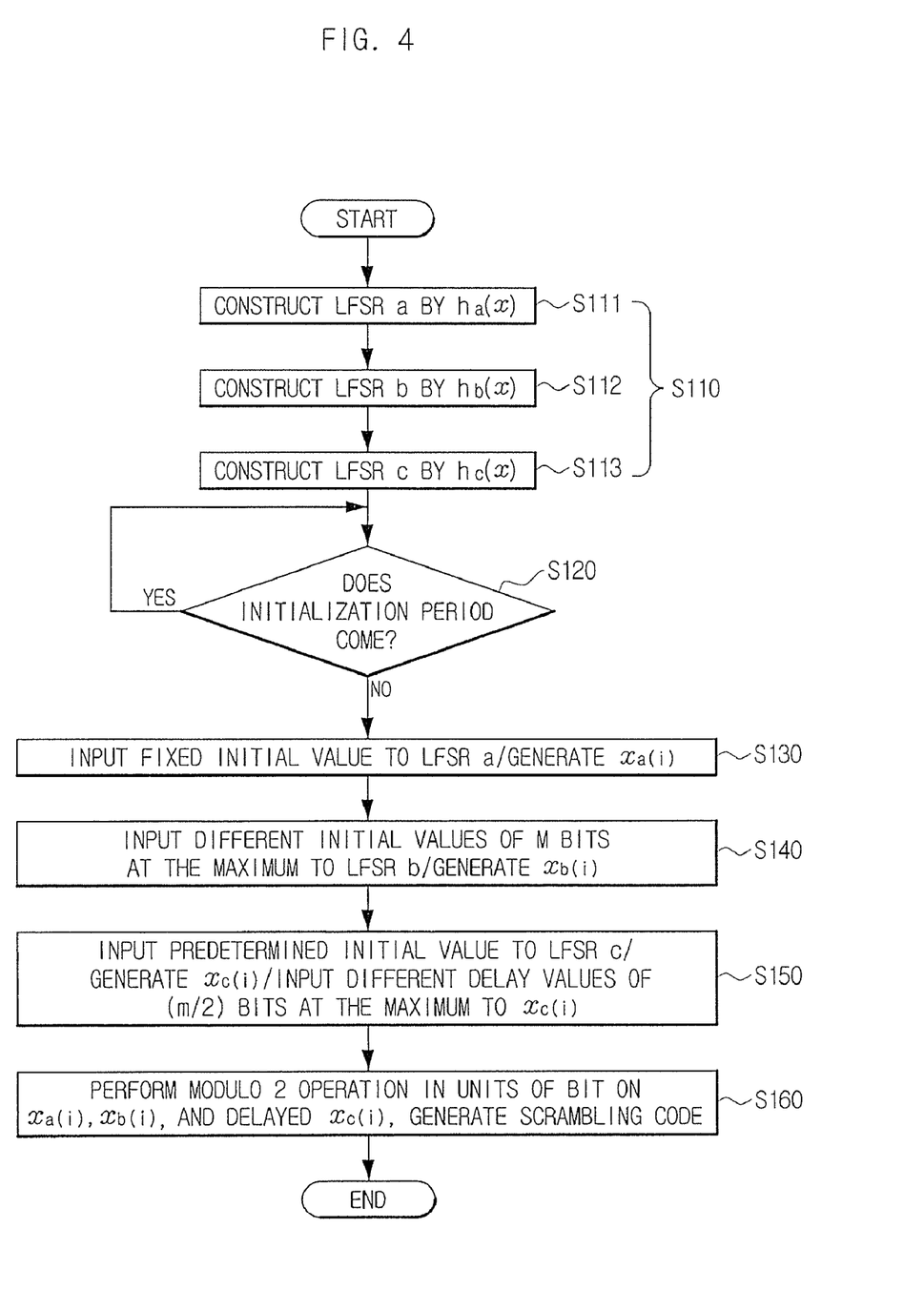
FIG. 4 is a flowchart illustrating a method for generating pseudo random sequence in a broadband wireless communication system according to an exemplary embodiment of the present invention.

FIG. 4 is a flowchart illustrating a method of generating pseudo random sequence in a broadband wireless communication system according to an exemplary embodiment of the present invention. The method of generating pseudo random sequence using the apparatus of FIG. 1 is shown.

The LFSR a 110, the LFSR b 120, and the LFSR c 130 are constructed by three different polynomials of degree m (S110). The LFSR a 110, the LFSR b 120, and the LFSR c 130 have m blocks and modulo 2 operators 114, 124, and 134, respectively, as illustrated in FIG. 1, each of which has m blocks. Then, which block in each of the LFSR a 110, the LFSR b 120, and the LFSR c 130 will be connected to the modulo 2 operator 114, 124, or 134 is determined by three different polynomials of degree m for generating Large sets of Kasami sequence of degree m.

Specifically, when a first primitive polynomial of degree m over GF(2) is selected, the LFSR a 110 is constructed by the selected first primitive polynomial of degree m (S111). A second polynomial is determined by sampling a binary sequence generated by the first primitive polynomial of degree m with a sampler $f=1+2^{\lfloor (m+2)/2 \rfloor}$, and the LFSR b 120 is constructed by the second polynomial (S112). In addition, a third polynomial is determined by sampling the binary sequence generated by the first primitive polynomial of degree m with a sampler $f=1+2^{m/2}$, and the LFSR c 130 is constructed by the third polynomial (S113). The first primitive polynomial of degree m is a polynomial of which the number of terms is smallest among plural primitive polynomials of degree m over GF(2), and the binary sequence generated by the first primitive polynomial of degree m becomes an m-sequence.

Thereafter, if the initialization period comes (S120), the controller 142 inputs a fixed initial value to the LFSR a 110 having m blocks through the first initial value mapper 112 to generate the first output sequence (S130), and inputs different initial values of m bits at the maximum to the LFSR b 120 through the second initial value mapper 122 to generate the second output sequence (S140). Here, the fixed initial value input to the LFSR a 110 may be <0, 0, 0, . . . , 0, 0, 1> or <1, 0, 0, . . . , 0, 0, 0> having a length of m, and the different initial values input to the LFSR b 120 may be one of total $2^m$ different initial values having a length of m from <0, 0, 0, ..., 0, 0, 0> to <1, 1, 1, ..., 1, 1, 1>.

Moreover, the controller 142 inputs a predetermined initial value to the LFSR c 130, and then gives different delay values of m/2 bits at the maximum for bits output from the LFSR c 130 to generate the delayed third output sequence (S150). The predetermined initial value input to the LFSR c 130 may be constructed as the initial m bits of a sequence sampled from the m-sequence output from the LFSR a 110 with a sampler $f=1+2^{m/2}$. Signs generated through the LFSR c 130 generate the third output sequence delayed by N clocks for the delay value N given by passing through the N delay operator 136. Here, the different initial values of m bits at the maximum input to the LFSR b 120 are distributed on the basis of some information in the specific identification information, and the different delay values of m/2 bits at the maximum given for bits output from the LFSR c 130 are distributed on the basis of the remaining information.

The first to the third sequences output from the LFSR a 110, the LFSR b 120, and the LFSR c 130 are added bit by bit through the modulo 2 operator 140, thereby generating a final pseudo random sequence (S160).

The every initialization period at which the initial values are input to the LFSR a 110, the LFSR b 120, and the LFSR c 130 is slightly changed depending on physical channels or physical signals of an uplink or a downlink, and a subframe period, a radio frame period, an OFDM symbol period, a code block period, and the like may be applied. In addition, as the specific system information, an UE ID, a cell ID, a subframe number, a stream ID, an MBSFN area ID, an OFDM symbol number, and the like may be applied.

Figure 5:
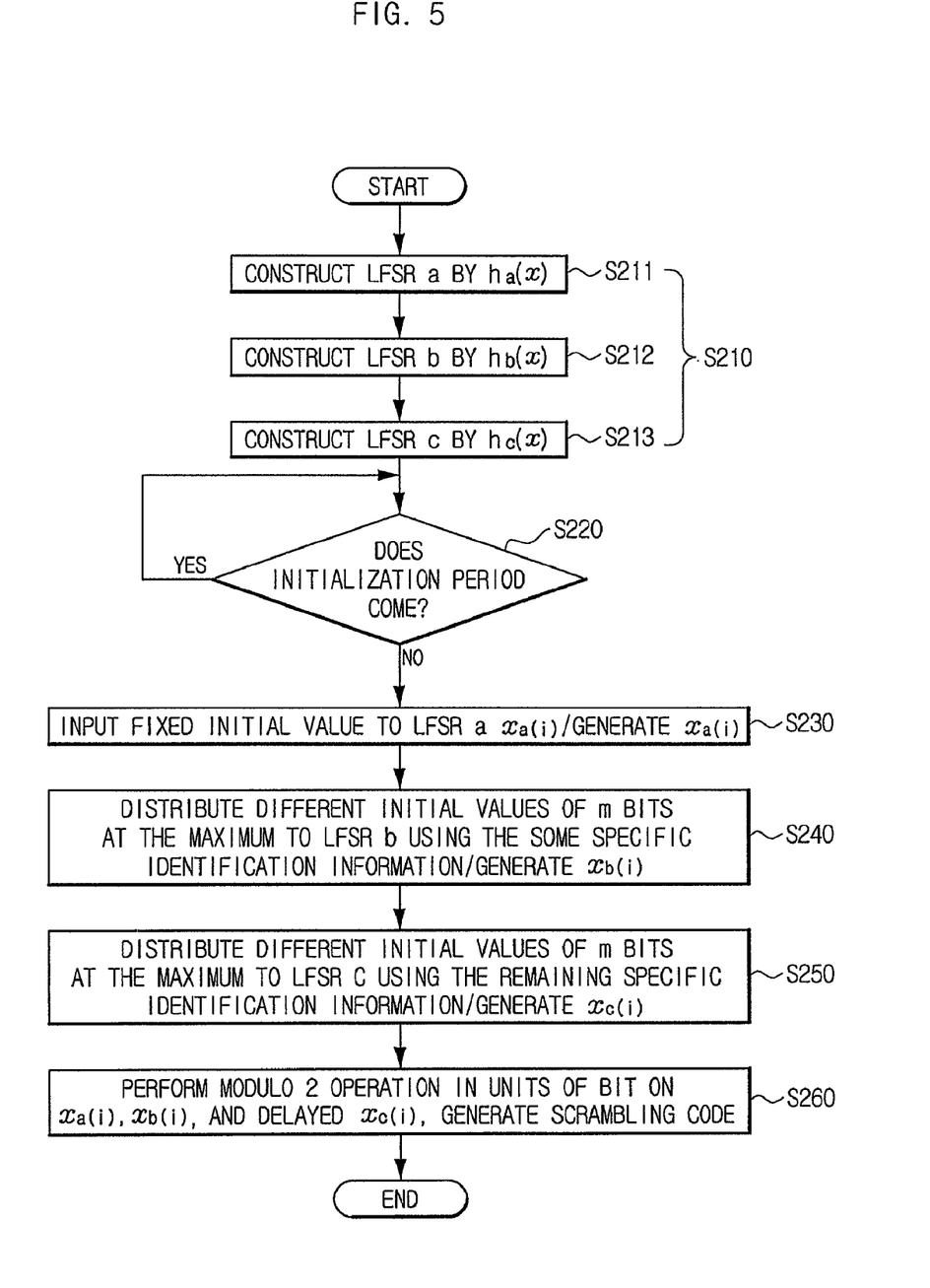
FIG. 5 is a flowchart illustrating a method for generating pseudo random sequence in a broadband wireless communication system according to an exemplary embodiment of the present invention.

FIG. 5 is a flowchart illustrating a method of generating pseudo random sequence in a broadband wireless communication system according to an exemplary embodiment of the present invention. The method of generating pseudo random sequence using the apparatus of FIG. 2 is shown.

Since the process S210, including S211, S212, and S213, is the same as S110, including S111, S112, and S113, respectively, of FIG. 4, a detailed description thereof will be omitted.

Here, three different polynomials of degree m for constructing the LFSR a 210, the LFSR b 220, and the LFSR c 230 are generated by using a binary sequence such as a t-error-correcting BCH code (t is a natural number equal to or greater than 3), a Modified or Extended Gold sequence, and a Modified or Extended Kasami sequence.

If the initial period comes (S220), the controller 252 inputs a fixed initial value to the LFSR a 210 having m blocks to generate the first output sequence (S230), inputs different initial values of m bits at the maximum to the LFSR b 220 to generate the second output sequence (S240), and inputs different initial values of m bits at the maximum to the LFSR c 230 to generate the third output sequence (S250). Here, the different initial values of m bits at the maximum input to LFSR b 220 are distributed on the basis of some information in the specific system information, and the different initial values of m bits at the maximum input to the LFSR c 130 are distributed on the basis of the remaining information in the specific system information. The first to the third sequences output from the LFSR a 210, the LFSR b 220, and the LFSR c 230 are added bit by bit through the modulo 2 operator 250, thereby generating a final pseudo random sequence (S260).

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for generating pseudo random sequence in a wireless communication system, comprising:
   generating a first output sequence by inputting a fixed initial value to a first linear feedback shift register (LFSR) having m blocks;
   generating a second output sequence by inputting one of m-bit initial values different from the fixed initial value to a second LFSR having m blocks;
   after inputting a predetermined initial value to a third LFSR having m blocks, generating a third output sequence by delaying a sequence output from the third LFSR by a non-zero delay value N; and
   generating the pseudo random sequence by summing the first output sequence, the second output sequence, and the third output sequence bit by bit through a modulo 2 operation.

2. The method of claim 1, further comprising constructing the first LFSR, the second LFSR, and the third LFSR, each of which has m blocks, by three different polynomials of degree m; and
   wherein the constructing of the first LFSR, the second LFSR, and the third LFSR comprises:
   selecting a first polynomial of degree m, and constructing the first LFSR by the first polynomial;
   determining a second polynomial of degree m by sampling a binary sequence generated by the first polynomial with a sampler $f=1+2^{\lfloor(m+2)/2\rfloor}$, and constructing the second LFSR by the second polynomial; and
   determining a third polynomial of degree m by sampling a binary sequence generated by the first polynomial with a sampler $f=1+2^{m/2}$, and constructing the third LFSR by the third polynomial.

3. The method of claim 2, wherein Large sets of Kasami sequence of degree m are generated based on the three different polynomials of degree m.

4. The method of claim 2, wherein the first polynomial of degree m is one having the smallest number of terms among plural primitive polynomials of degree m over Galois Field of two (GF(2)), and the binary sequence generated by the first polynomial is an m-sequence.

5. The method of claim 1, wherein the m-bit initial values input to the second LFSR are distributed on the basis of some information of which the sum of total information bits is between 1 and m bits among specific system information, and
   the delay values given for the sequence output from the third LFSR are distributed on the basis of remaining information of which the sum of total information bits is between 0 and m/2 bits among the specific system information.

6. The method of claim 5, wherein the specific system information comprises information on any one of a user equipment identification (UE ID), a cell ID, a cell group ID, a component carrier (CC) ID, a component carrier (CC) offset, a relay node ID, a Home node B (HeNB) ID, a system frame number, a subframe number, a slot number, an Orthogonal Frequency Division Multiplexing (OFDM) symbol number, a stream ID, and a Multimedia Broadcast and Multicast Service (MBMS) over Single-Frequency Network (MBSFN) area ID, per each physical channel or each physical signal of an uplink or a downlink.

7. The method of claim 1, wherein the fixed initial value input to the first LFSR is <0,0,0,...,0,0,1> or <1,0,0,...,0,0,0> having a length of m.

8. The method of claim 1, wherein the one of m-bit initial values input to the second LFSR is one of elements of subset of the set A, which have M elements, and wherein the set A has total $2^m$ different m-bit initial values, and M ($0<M\leq 2^m$) is determined on the basis of the number of cases of specific system information distributed to the second LFSR.

9. The method of claim 1, wherein the predetermined initial value input to the third LFSR is constructed with first m bits of a sequence obtained by sampling a binary sequence output from the first LFSR with a sampler $f=1+2^{m/2}$.

10. The method of claim 1, wherein the delay value N is one of total M' different delay values from 0 to M'−1, and wherein M' ($0\leq M'\leq 2^{m/2}$) is determined on the basis of the number of cases of the specific system information distributed to the third LFSR.

11. The method of claim 1, wherein the fixed initial value, the one of m-bit initial values, and the predetermined initial value are input at every initialization period, and the every initialization period comprises one of a subframe period, a radio frame period, an Orthogonal Frequency Division Multiplexing (OFDM) symbol period, a slot period, and a code block period, per each physical channel or each physical signal of an uplink or a downlink.

12. A method for generating pseudo random sequence in a wireless communication system, comprising:

generating a first output sequence by inputting a fixed initial value to a first linear feedback shift register (LFSR) having m blocks;

generating a second output sequence by inputting one of m-bit initial values different from the fixed initial value to a second LFSR having m blocks;

generating a third output sequence by inputting one of m-bit initial values different from the fixed initial value to a third LFSR having m blocks; and generating the pseudo random sequence by summing the first output sequence, the second output sequence, and the third output sequence bit by bit through a modulo 2 operation.

13. The method of claim 12, further comprising constructing the first LSFR, the second LSFR, and the third LFSR, each of which has m blocks, by three different polynomials of degree m, and wherein one of 3-error-correcting BCH code, Modified or Extended Gold sequence, or Modified or Extended Kasami sequence is generated based on the three different polynomials of degree m.

14. The method of claim 12, wherein the m-bit initial values input to the second LFSR are distributed on the basis of some information of which the sum of total information bits is between 1 and m bits among specific system information, and the m-bit initial values input to the third LFSR are distributed on the basis of remaining information of which the sum of total information bits is between 0 and m bits among the specific system information.

15. The method of claim 12, wherein the one of m-bit initial values input to the second LFSR is one of elements of subset of set A, which have M elements, wherein the set A having total 2m different m-bit initial values, and M ($0<M\leq 2^m$) is determined on the basis of the number of cases of specific system information distributed to the second LFSR, and the one of m-bit initial values input to the third LFSR is one of elements of subset of set B, which have M' elements, wherein the set B having total $2^m$ different m-bit initial values, and M' ($0\leq M'\leq 2^m$) is determined on the basis of the number of cases of specific system information distributed to the third LFSR.

16. An apparatus for generating pseudo random sequence in a wireless communication system, comprising:

a first linear feedback shift register (LFSR), a second LSFR, and a third LFSR, each of which has m blocks;

a first initial value mapper to input a fixed initial value to the first LFSR;

a second initial value mapper to input one of m-bit initial values different from the fixed initial value to the second LFSR;

a third initial value mapper to input a predetermined initial value to the third LFSR;

an N delay operator to delay a sequence output from the third LFSR receiving the initial value from the third initial value mapper by N clocks for a non-zero delay value N; and a modulo 2 operator to sum the first output sequence, the second output sequence, and the third output sequence bit by bit through a modulo 2 operation.

17. The apparatus of claim 16, wherein the first LFSR is constructed from a first polynomial of degree m selected from plural primitive polynomials of degree m over Galois Field of two (GF(2));

the second LFSR is constructed from a second polynomial determined by sampling a binary sequence generated by the first polynomial with a sampler $f=1+2^{\lfloor (m+2)/2 \rfloor}$; and the third LFSR is constructed from a third polynomial determined by sampling a binary sequence generated by the first polynomial with a sampler $f=1+2^{m/2}$.

18. The apparatus of claim 16, wherein the first LFSR, the second LFSR, and the third LFSR are constructed from three different polynomials of degree m, and Large sets of Kasami sequence of degree m are generated based on the three different polynomials of degree m.

19. An apparatus for generating pseudo random sequence in a wireless communication system, comprising:

a first linear feedback shift register (LFSR), a second LFSR, and a third LFSR, each of which has m blocks;

a first initial value mapper to input a fixed initial value to the first LFSR;

a second initial value mapper to input one of m-bit initial values different from the fixed initial value to the second LFSR;

a third initial value mapper to input one of m-bit initial values different from the fixed initial value to the third LFSR; and a modulo 2 operator to sum the first output sequence, the second output sequence, and the third output sequence bit by bit through a modulo 2 operation.

20. The apparatus of claim 19, wherein the first LFSR, the second LFSR, and the third LFSR are constructed from three different polynomials of degree m, and a binary sequence comprising any one of 3-error-correcting BCH code, Modified or Extended Gold sequence, or Modified or Extended Kasami sequence is generated based on the three different polynomials of degree m.

21. The method of claim 1, wherein the one of m-bit initial values and the given delay value N are determined based on specific system information.

22. The method of claim 12, wherein the one of m-bit initial values to the second LFSR and the one of m-bit initial values to the third LFSR are determined based on specific system information.

* * * * *